United States Patent
Bajo et al.

(10) Patent No.: US 6,500,058 B2
(45) Date of Patent: Dec. 31, 2002

(54) CLOGGING-FREE DRAIN SYSTEM INSTALLED IN A CUTTING APPARATUS

(75) Inventors: Sojiro Bajo, Tokyo (JP); Okiharu Tamura, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/948,680

(22) Filed: Sep. 10, 2001

(65) Prior Publication Data
US 2002/0037692 A1 Mar. 28, 2002

(30) Foreign Application Priority Data
Sep. 27, 2000 (JP) .................................... 2000-294160

(51) Int. Cl.[7] ............................................... B24B 41/00
(52) U.S. Cl. ............................ 451/361; 451/87; 451/88; 451/450
(58) Field of Search ............................... 41/87, 88, 361, 41/450, 40

(56) References Cited

U.S. PATENT DOCUMENTS 4,574,530 A * 3/1986 Handler et al. ............. 451/279
6,102,023 A * 8/2000 Ishiwata et al. ............ 125/13.01
6,345,616 B1 * 2/2002 Umahashi ................... 125/13.01

* cited by examiner

Primary Examiner—Timothy V. Eley
Assistant Examiner—Alvin J. Grant
(74) Attorney, Agent, or Firm—Wenderoth, Lind & Ponack, L.L.P.

(57) ABSTRACT

Disclosed is a clog-free drain system installed in a cutting apparatus. The system includes an expandable cover for covering a path which a chuck table follows, a water case for receiving used machining water guided by the expandable cover, and a drain pool for tentatively storing the used machining water from the water case before allowing it to drain off. The drain pool has its bottom positioned at a level lower than the bottom of the water case, and the drain pool has its drain outlet formed at a level higher than the bottom of the drain pool. The water case has water flow creating apparatus for driving the used machining water to the water pool.

5 Claims, 4 Drawing Sheets

CLOGGING-FREE DRAIN SYSTEM INSTALLED IN A CUTTING APPARATUS

BACKGROUND OF THE INVENTION

1. Field of the Invention

The present invention relates to a drain system installed in a cutting apparatus to drain used machining water off.

2. Related Arts

Referring to FIG. 8, a cutting apparatus 70 for use in dicing semiconductor wafers comprises a chuck table 21 for holding a workpiece W thereon, and a cutting means 22 which can be driven both in the Y-axial and Z-axial directions to cut the workpiece W on the chuck table 21. The chuck table 21 is supported rotatably on a platform 24, which can be driven in the X-axial direction.

Expandable cover cloths 11 and 12 are fixed to the opposite ends of the platform 24 to cover the open top 16a of a water case 80. The cutting means 22 has a rotary blade 31 to be driven at a high-rotating speed, and machining water supply nozzles 32 placed on the opposite sides of the rotary blade 31.

A semiconductor wafer W is attached to a holder frame F via an adhesive tape T. The cutting means 22 is driven both in the Y-and Z-axial directions, while the chuck table 21 is driven in the X-axial direction reciprocatingly. Every time the cutting in the X-axial direction has been completed, the cutting means 22 is driven an incremental step in the Y-axial direction, and then, the X-axial cutting is effected. Thus, the wafer W is cut in the X-axial direction, leaving each incremental distance apart in the Y-axial direction. Then, the chuck table 21 is rotated 90 degrees, and similar cutting is repeated to dice the wafer W crosswise.

The opposite expandable cloths 11 and 12 are allowed to expand and shrink in the opposite directions when the platform 24 reciprocates in the X-axial direction. Thus, the open top 16a of the water case 80 is covered by the overlying expandable cloths 11 and 12 all the time. The machining water from the machining water supply nozzles 32 is allowed to fall in the water case 80 while being prevented from scattering by the overlying expandable cloths 11 and 12, and then, the used machining water flows in the water channels 19a, 19b, 19c and 19d, which are defined between the inner and outer surrounding walls 16 and 17, and finally, the used machining water drains off from a drain 52 without allowing it to remain and invade the inside of the cutting machine.

In a case where a workpiece of a relatively large specific gravity such as ceramic material is cutting, pulverized ceramic material is laid on the bottom of the water case 80 so that the drain channel may be clogged to allow the used machining water to overflow and invade the inside of the cutting machine.

SUMMARY OF THE INVENTION

One object of the present invention is to provide a clogging-free drain system for a cutting apparatus to prevent the used machining water from overflowing and invading the inside of the cutting apparatus even though workpieces of large specific gravity are cut.

In a cutting apparatus comprising at least a chuck table for holding a workpiece thereon, a means for driving the chuck table in the direction in which the workpiece is to be cut, and a means for cutting the workpiece on the chuck table while supplying machining water to the workpiece, a drain system is improved according to the present invention in that it comprises: an expandable cover whose opposite ends are fixed to the opposite ends of the path on which the chuck table is driven to cover the path; a water case in which the flow of the machining water is guided by the expandable cover after washing the workpiece; and a drain pool for storing the used machining water from the water case tentatively before allowing the used machining water to drain off.

The drain pool may have its bottom positioned at a level lower than the bottom of the water case, and the drain pool has its drain outlet formed at a level higher than the bottom of the drain pool. The water case may have water flow creating means for driving the used machining water to the water pool.

With the arrangement as described above, pulverized material is allowed to be deposited on the bottom of the drain pool, so that little or no pulverized material may be left on the bottom of the water case, thus preventing the used machining water from overflowing. There is no fear of the drain being clogged with pulverized material because its top opening is high above the deposition. Further, according to the water flow creating means provided in the water case, even the pulverized material of large specific gravity can be forcedly driven to the drain pool without allowing it to remain in the drain channels.

Other objects and advantages of the present invention will be understood from the following description of clogging-free drain systems according to preferred embodiments of the present invention which are shown in accompanying drawings.

DETAILED DESCRIPTION OF PREFERRED EMBODIMENT

Figure 1:
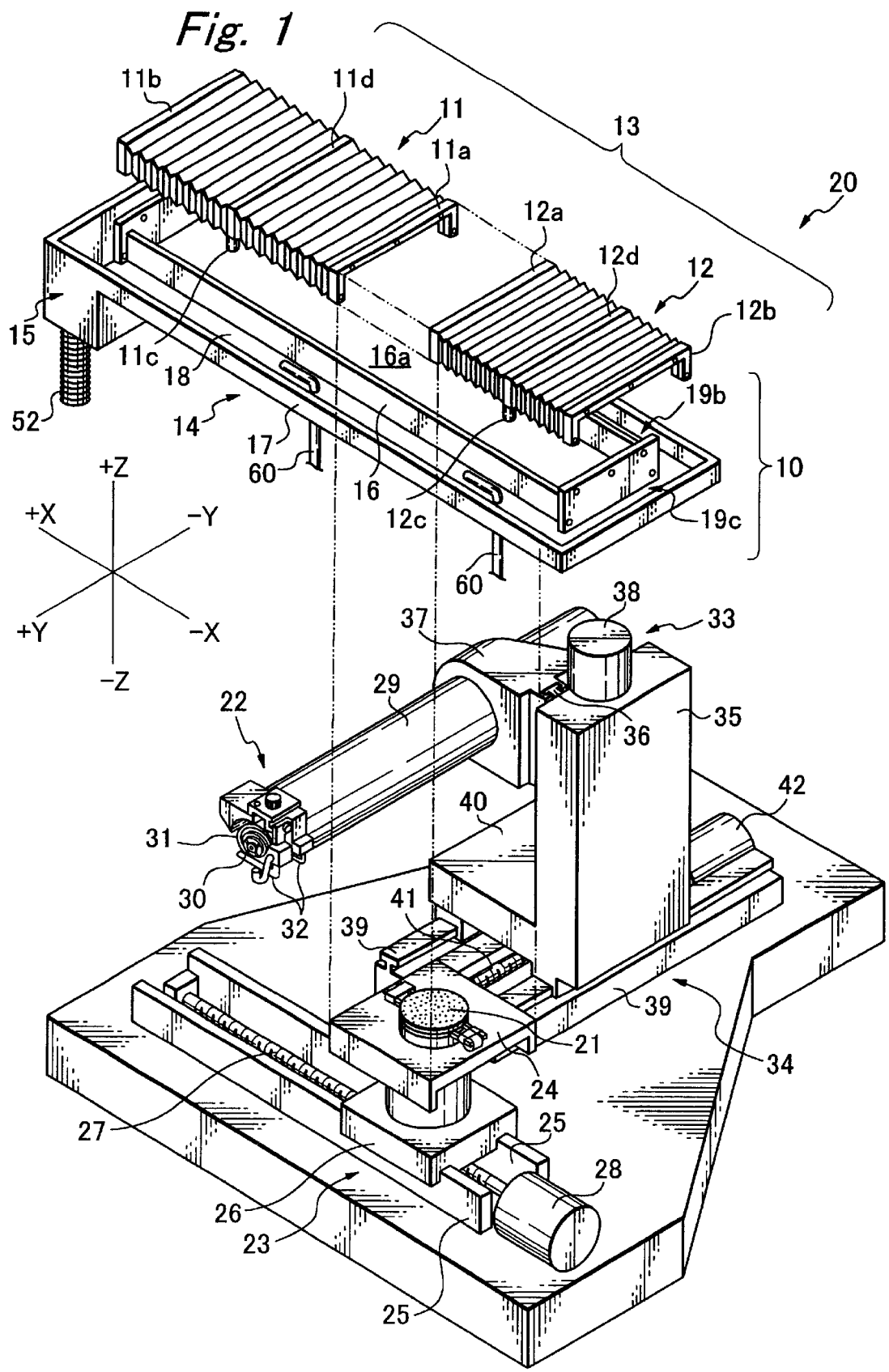
FIG. 1 is an exploded view of a drain system according to one embodiment of the present invention.

FIG. 1 shows a drain system 20 according to a first embodiment of the present invention as being installed in a cutting machine 10, which includes a chuck table 21 for holding a workpiece thereon, a means 23 for driving the chuck table 21 in the X-axial direction in which the workpiece is to be cut, and a means 22 for cutting the workpiece on the chuck table 21 while supplying machining water to the workpiece. The chuck table 21 is rotatably supported on the platform 24, which can be driven by the driving means 23 in the X-axial direction.

The driving means 23 comprises a pair of parallel rails 25 extending in the X-axial direction, a movable block 26 riding on the parallel rails 25, a screw rod 27 threadedly engaged with the tapped part (not shown) of the movable block 26, and a stepping motor 28 connected to the screw rod 27 to drive the screw rod. The platform 24 supports rotatably the chuck table 21, and is fixed to the X-axial movable block 26.

The cutting means 22 comprises a spindle housing 29 extending from a rising-and-descending block 37 (later described) in the Y-axial direction, a spindle 30 rotatably supported by the spindle housing 29, a rotary blade 31 attached to the spindle 30 and machining water supplying nozzles 32 positioned on the opposite sides of the rotary blade 31. The cutting means 22 is supported by a vertical driving means 33 movably in the Z-axial direction in which the rotary blade 31 cuts the thickness of the workpiece. The vertical driving means 33 is supported by an indenting means 34 movably in the Y-axial direction, in which the vertical driving means 33 is moved an incremental step.

The vertical driving means 33 comprises a Z-axial guide rail 36 extending on the vertical wall 35 of an "L"-shaped movable base, a rising-and-descending block 37 riding on the Z-axial guide rail 36, a Z-axial screw rod (not shown) threadedly engaged with the tapped part of the rising-and-descending block 37 and a Z-axial stepping motor 38 having its shaft connected to the Z-axial screw rod. Rotation of the stepping motor 38 raises and lowers the rising-and-descending block 37 in the Z-axial direction.

The indentation means 34 comprises a pair of Y-axial parallel guide rails 39, a flat shelf 40 supported slidably on the Y-axial parallel guide rails 39 and formed integrally with the vertical wall 35, a Y-axial screw rod 41 threadedly engaged with the tapped part of the flat shelf 40, and a Y-axial stepping motor 42 having its shaft connected to the Y-axial screw rod 41. Rotation of the stepping motor 42 moves the flat shelf 40 in the Y-axial direction.

The drain system 10 comprises an expandable cover 13 composed of two bellows-like cloths 11 and 12, a water case 14 for receiving the used machining water falling from the expandable cover 13, and a drain pool 15 for tentatively storing the used machining water falling from the water case 14. The water case 14 comprises inner and outer surrounding walls 16 and 17 standing upright on its flat bottom plate 18 to define three drain channels 19a, 19b and 19c running longitudinally and laterally between the inner and outer surrounding walls 16 and 17, and a drain pool 15 formed at the lateral end in which the opposite longitudinal drain channels 19a and 19b merge.

As seen from FIG. 1, the bellows-like cloth 11 has first and second fixing frames 11a and 11b on its opposite ends. The first fixing frame 11a is bolted to one side (the left side in the drawing) of the platform 24 on the +X-directional side whereas the second fixing frame 11b is bolted to one end (the left end in the drawing) of the inner wall 16 of the water case 14 on the +X-directional side.

Likewise, the bellows-like cloth 12 has first and second fixing frames 12a and 12b on its opposite ends. The first fixing frame 12a is bolted to the other side (the right side in the drawing) of the platform 24 on the −X-directional side whereas the second fixing frame 12b is bolted to the other end (the right end in the drawing) of the inner wall 16 of the water case 14 on the −X-directional side.

The bellows-like cloth 11 has a guide plate 11d at its intermediate traverse whereas the bellows-like cloth 12 has a guide plate 12d on its intermediate traverse. Each guide plate 11d or 12d has rolls 11c or 12c on its lower surface. These guide plates prevent the bellows-like cloths from being pulled down by their weights. Thus, the bellows-like cloths 11 and 12 cover the open top 16a of the water case 14, i.e. the path on which the chuck table 21 moves back and forth, all the time.

Figure 2:
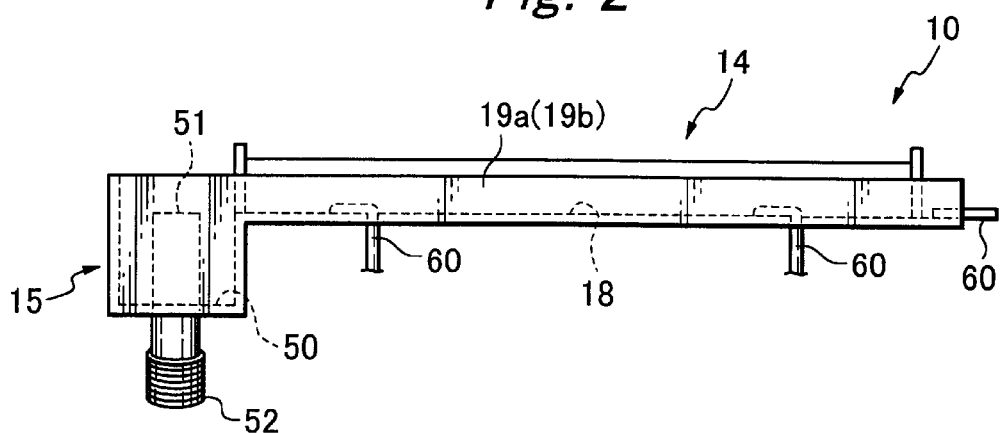
FIG. 2 is a front view of the drain system.

As seen from FIG. 2, the drain pool 15 has its bottom 50 formed at a level lower than the bottom 18 of the water case 14, allowing the used machining water to fall in the water pool 15.

The water pool 15 has a drain outlet 51 communicating with the drain 52, and the drain outlet 51 is open at a level higher than the bottom 50 of the drain pool 15.

Figure 3:
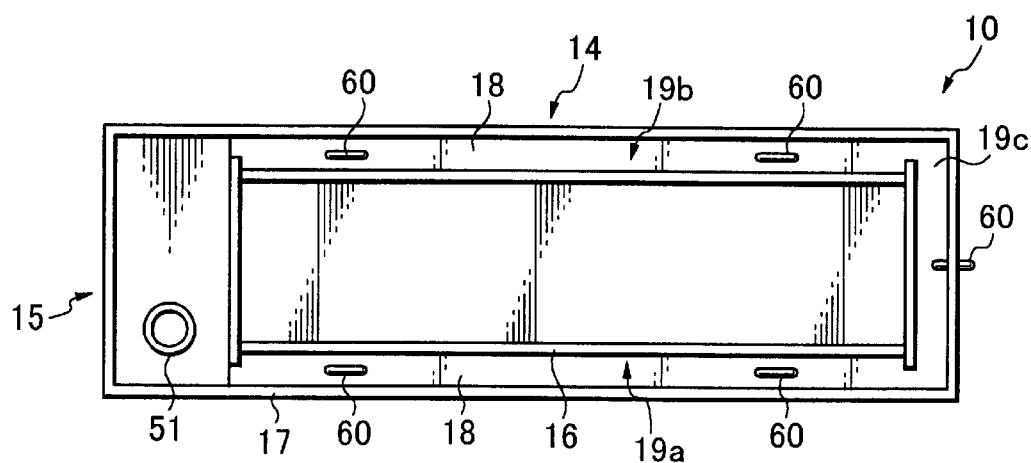
FIG. 3 is a plane view of the drain system.

As seen from FIGS. 1 to 3, the water case 14 has a water flow creating means 60 formed on its bottom 18. It comprises nozzles for ejecting liquid or air toward the drain pool 15, thereby creating water currents toward the drain pool 15 to forcedly accompany the used machining water and pulverized material, which otherwise, would remain on the bottom of the drain channels.

The nozzles 60 are arranged in the longitudinal drain channels 19a and 19b and in the lateral drain channel 19c so that the used machining water may be driven effectively to the drain pool 15. Such nozzles may be positioned elsewhere at any places appropriate for the purpose.

With this arrangement the used machining water is led to the water case 14 via the bellows-like cloths, and then it is forcedly driven to the drain pool 15 by the water flow creating means 60 via the longitudinal and lateral drain channels 19a, 19b and 19c. Even the pulverized material of large specific gravity can be forcedly driven to the drain pool 15 without allowing it to remain in the drain channels due to the water currents toward the drain pool 15 created by the water flow creating means 60. Thus, the overflowing of used machining water from the water case 14 can be prevented.

In a case where no water flow creating means 60 are used, the water case 14 may be designed to be so tilted that the used machining water may be made to flow toward the drain pool 15.

Thanks to the drain outlet 51 positioned at a level higher than the bottom 50 of the drain pool 15, pulverized material remaining on the bottom 50 of the drain pool cannot clog the drain outlet 51, assuring that used machining water be drained off all the time.

Figure 4:
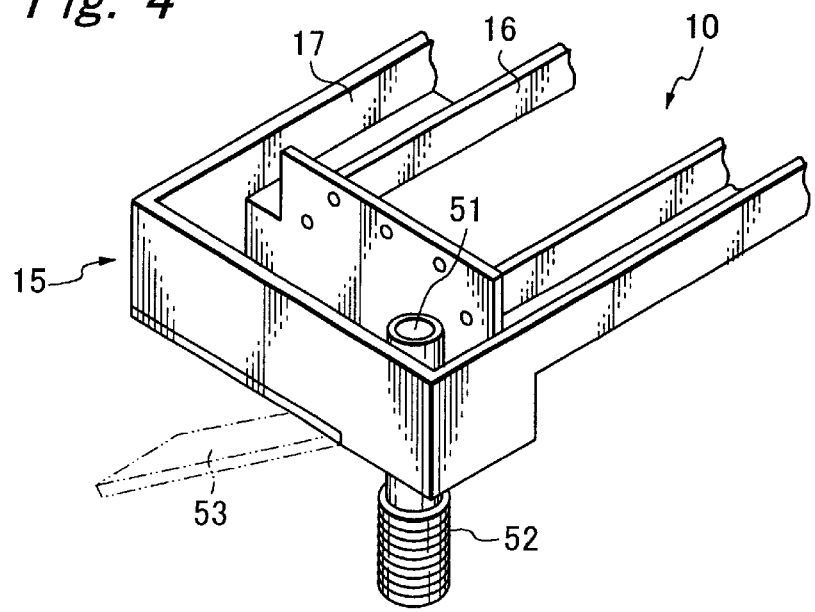
FIG. 4 is a perspective view of the drain system.

Referring to FIG. 4, the drain pool 15 has an opening-and-closing plate 53 hinged to its bottom, thereby permitting pulverized material to be removed from the drain pool 15 readily.

Figure 5:
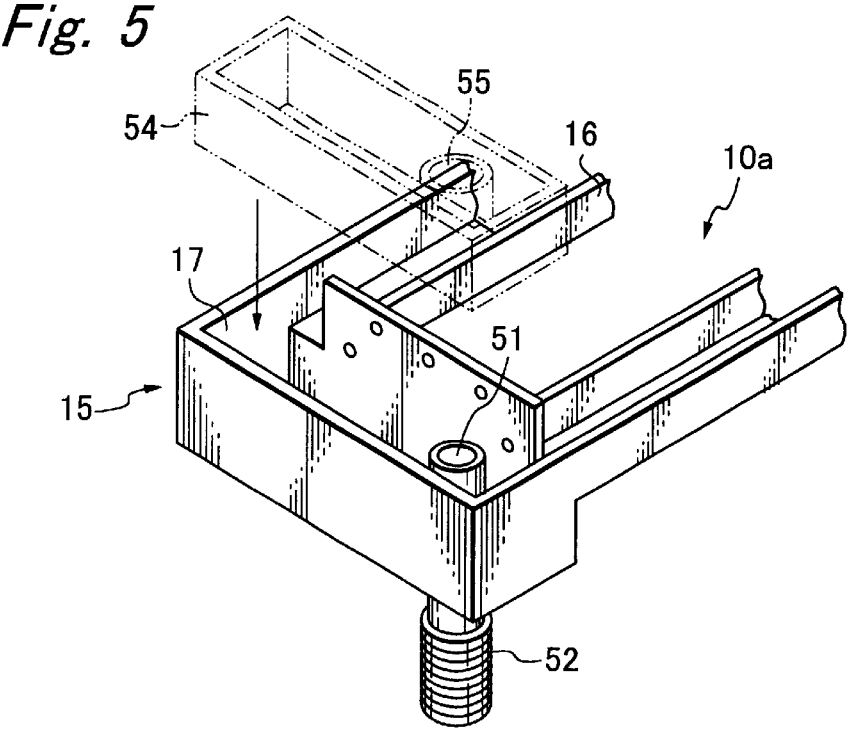
FIG. 5 is a perspective view of a drain system according to another embodiment.
Figure 6:
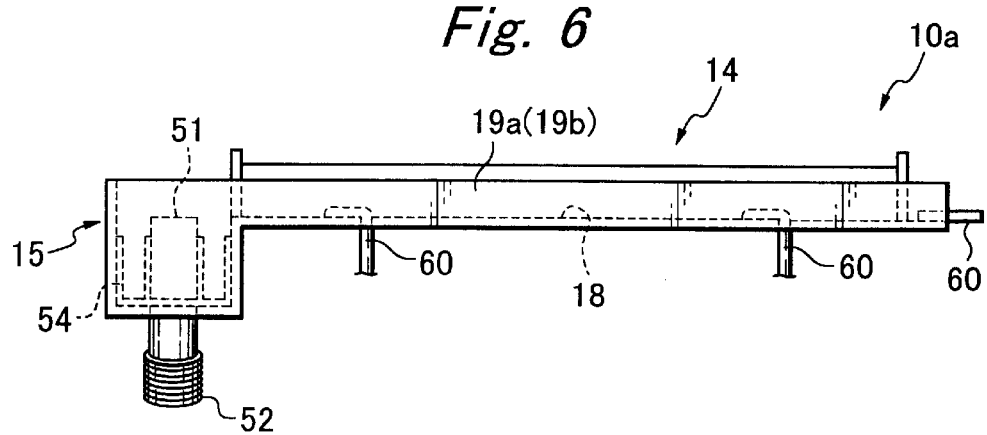
FIG. 6 is a front view of the drain system of FIG. 5.
Figure 7:
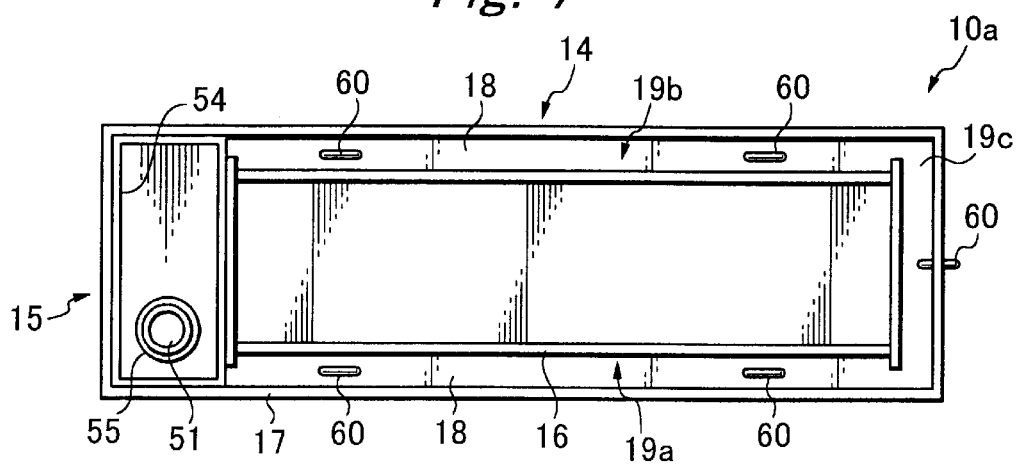
FIG. 7 is a plane view of the drain system of FIG. 5.
Figure 8:
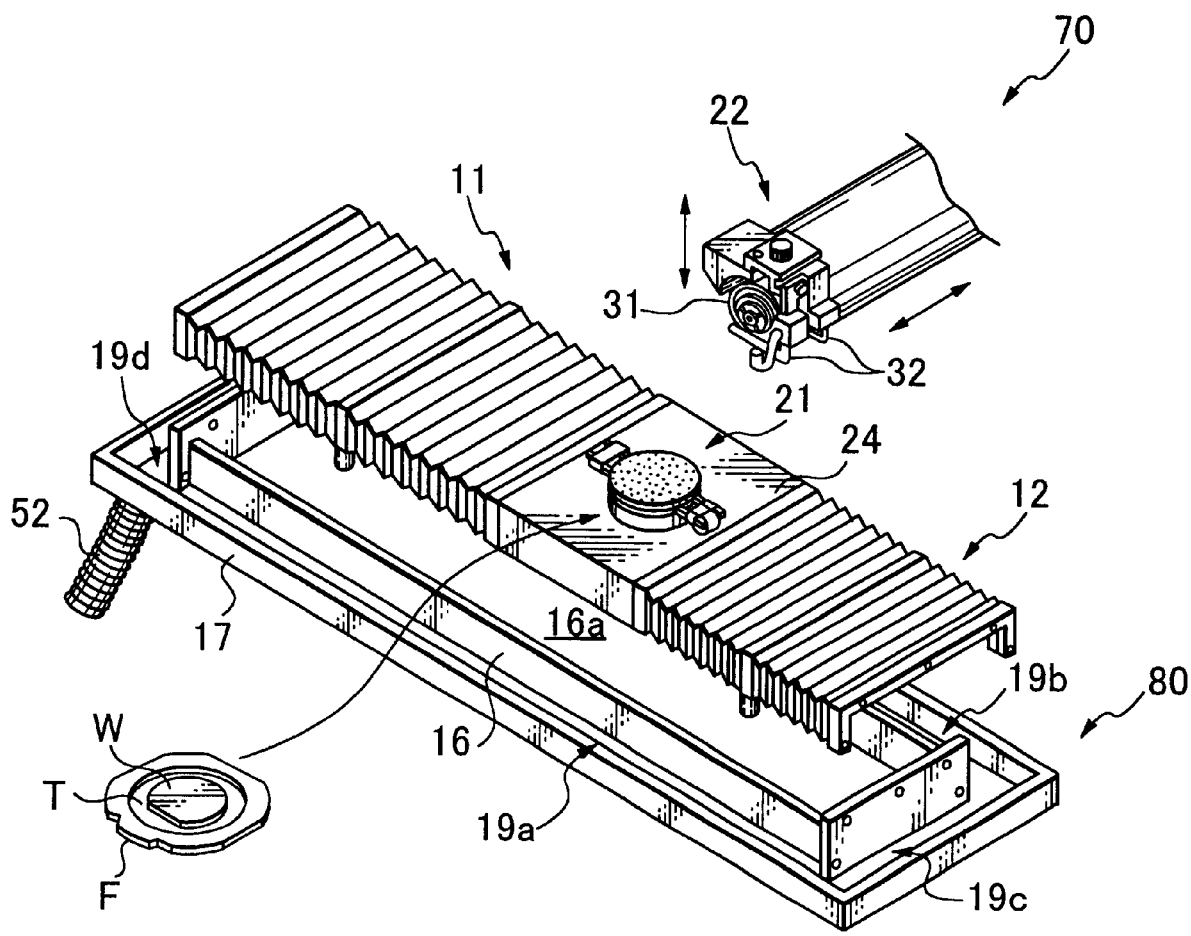
FIG. 8 is a conventional cutting apparatus equipped with a drain system.

Referring to FIGS. 5 to 7, a detachable drain box 54 is removably put in the drain pool 15, and when pulverized material is collected in the drain box 54, it is removed from the drain pool 15 to throw the remaining content away. Referring to FIG. 5, the drain box 54 has a hole 55 made on its bottom, thereby allowing the drain outlet 51 to pass therethrough when the drain box 54 is fitted in the drain pool 15 as seen from FIG. 7. There is no adverse effect on the draining-off of used machining water from the drain 52.

What is claimed is:

1. In a cutting apparatus comprising at least a chuck table for holding a workpiece thereon, a means for driving the chuck table in the direction in which the workpiece is to be cut, and a means for cutting the workpiece on the chuck table while supplying machining water to the workpiece, a clog-free drain system comprising:

an expandable cover whose opposite ends are fixed to the opposite ends of the path on which the chuck table is driven to cover the path;

a water case for receiving used machining water guided by the expandable cover; and a drain pool for tentatively storing the used machining water from the water case before allowing the used machining water to drain off.

2. A clog-free drain system according to claim 1, wherein the drain pool has its bottom positioned at a level lower than a bottom of the water case, and the drain pool has its drain outlet formed at a level higher than the bottom of the drain pool.

3. A clog-free drain system according to claim 2, wherein the water case has water flow creating means for causing the used machining water to flow toward the drain pool.

4. A clog-free drain system according to claim 3, wherein said water flow creating means comprises fluid nozzles positioned in said water case.

5. A clog-free drain system according to claim 2, wherein fluid nozzles are provided in the water case and are arranged so as to create fluid flow in a direction to cause the used machining water to flow toward the drain pool.

* * * * *